(12) United States Patent
Hsu et al.

(10) Patent No.: US 8,982,714 B2
(45) Date of Patent: Mar. 17, 2015

(54) METHODS FOR EXCHANGING DATA IN A COMMUNICATIONS SYSTEM AND APPARATUSES UTILIZING THE SAME

(75) Inventors: Yung Ping Hsu, Hsinchu (TW); Yuh-Ren Jauh, TaoYuan (TW); Chao-Chun Wang, Taipei (TW)

(73) Assignee: Mediatek Inc., Hsinchu (TW)

( * ) Notice: Subject to any disclaimer, the term of this patent is extended or adjusted under 35 U.S.C. 154(b) by 993 days.

(21) Appl. No.: 12/611,206

(22) Filed: Nov. 3, 2009

(65) Prior Publication Data

US 2010/0111089 A1    May 6, 2010

Related U.S. Application Data

(60) Provisional application No. 61/111,365, filed on Nov. 5, 2008.

(51) Int. Cl.
*H04L 1/00* (2006.01)
*H04J 3/16* (2006.01)
*H04B 17/00* (2006.01)
*H04L 7/00* (2006.01)
*H04W 28/18* (2009.01)
*H01Q 3/26* (2006.01)
(Continued)

(52) U.S. Cl.
CPC ............... *H04W 28/18* (2013.01); *H01Q 3/26* (2013.01); *H01Q 3/30* (2013.01); *H04B 7/0619* (2013.01); *H04B 7/0663* (2013.01)
USPC ......... 370/252; 370/465; 455/67.14; 375/358

(58) Field of Classification Search
None
See application file for complete search history.

(56) References Cited

U.S. PATENT DOCUMENTS 7,324,605 B2 *   1/2008   Maltsev et al. ............... 375/299
2005/0053164 A1   3/2005   Catreux et al.
2005/0068916 A1 * 3/2005   Jacobsen et al. ............. 370/328
(Continued)

FOREIGN PATENT DOCUMENTS

CN   1437345 A     8/2003
CN   101039163 A   9/2007

OTHER PUBLICATIONS

English abstract of CN1437345, pub. Aug. 20, 2003.
(Continued)

*Primary Examiner* — Faruk Hamza
*Assistant Examiner* — Cassandra Decker
(74) *Attorney, Agent, or Firm* — McClure, Qualey & Rodack, LLP

(57) ABSTRACT

A communication system is provided. A first communications device transmits at least one first message including predetermined bit sequences. A second communications device determines one or more antenna weighting vectors (AWVs) and one or more bitloading vectors (BLVs) by using the first message in accordance with a predetermined rule and transmits a second message including information pertinent to the AWVs and the BLVs to the first communications device. The first communications device further communicates with the second communications device about an AWV selected from the AWVs and the first and second communications devices apply the selected AWV to the corresponding antennas before exchanging data. The data includes a header carrying information pertinent to a BLV selected from the BLVs used to encode the data and a payload is transmitted to the second communications device. The second communications device decodes the data in accordance with the selected BLV.

20 Claims, 4 Drawing Sheets

(51) Int. Cl.
*H01Q 3/30* (2006.01)
*H04B 7/06* (2006.01)

(56) References Cited

U.S. PATENT DOCUMENTS

| | | | |
|---|---|---|---|
| 2005/0136841 A1* | 6/2005 | Frank | 455/65 |
| 2006/0114816 A1* | 6/2006 | Maltsev et al. | 370/210 |
| 2008/0232490 A1* | 9/2008 | Gross et al. | 375/260 |
| 2008/0247370 A1* | 10/2008 | Gu et al. | 370/338 |
| 2008/0254752 A1* | 10/2008 | Oh et al. | 455/83 |
| 2009/0121935 A1* | 5/2009 | Xia et al. | 342/377 |
| 2009/0252251 A1* | 10/2009 | Tosato et al. | 375/267 |

OTHER PUBLICATIONS

English abstract of CN101039163, pub. Sep. 19, 2007.
"Adaptive bite loading for vertically encoded MIMO"; Li et al., IEEE C802.16e-05/103r1, Mar. 9, 2005.

* cited by examiner

METHODS FOR EXCHANGING DATA IN A COMMUNICATIONS SYSTEM AND APPARATUSES UTILIZING THE SAME

CROSS REFERENCE TO RELATED APPLICATIONS

This application claims the benefit of U.S. Provisional Application No. 61/111,365 filed Nov. 5, 2008, and entitled "METHOD FOR UPDATING CHANNEL INFORMATION IN A WIRELESS COMMUNICATIONS SYSTEM". The entire contents of which are hereby incorporated by reference.

BACKGROUND OF THE INVENTION

1. Field of the Invention

The invention relates to a method for exchanging data between a first and a second communications devices utilized in a communications system.

2. Description of the Related Art

A communications system operating at a millimeter wave (mmWave) band has a number of advantages. For example, the mmWave band is cleaner because there is less interference. A mmWave channel is capable of providing high bandwidth, of up to a gigabit per second. The challenges for a communications system when operating at an mmWave band, however, include that the radiation pattern of signals is highly directional and the medium has higher attenuation rate.

Broadband mmWave wireless communications systems may potentially be used for high bandwidth communications. However, it is crucial for the design of a broadband mmWave wireless communications system to attain and maintain as high a channel rate as possible when the mmWave band is impaired by interferences or multi-path channel fading. To address the directionality and attenuation of radio signals at the mmWave band, beamforming is a technique used to improve the reach and integrity of signals. To perform beamforming, a communications device operating at the mmWave band is embedded with an antenna array. An antenna array consists of a plurality of antennas spaced according to a predefined pattern. By applying a predetermined antenna weighting vector (AWV) to an antenna array, the radiation pattern of the signal is shaped and points toward a predetermined direction.

Another technique used in mmWave wireless communications systems is orthogonal frequency-division multiplexing (OFDM). Specifically, OFDM is used as the modulation scheme for signals. The OFDM scheme divides a broadband channel into a plurality of sub-carriers. Data transmitted over the mmWave channel are encoded, distributed to a plurality of sub-carriers, modulated according to a predetermined modulation scheme, and transmitted over the air to a receiving communications device.

Generally, interference affects a portion of the plurality of sub-carriers of a channel, thereby resulting in an increase in transmitted data errors. While mitigation methods may be used to reduce the transmitted data errors, the methods also reduce channel bandwidth capacity. As a result, an error mitigation method that minimizes the effect to the channel bandwidth is desired.

BRIEF SUMMARY OF THE INVENTION

A communications system and methods for exchanging data between a first and a second communications devices utilized in the communications system are provided. An embodiment of a communications device comprises a first communications device and a second communications device. The first communications device transmits at least one first message comprising a plurality of predetermined bit sequences. The second communications device determines one or more antenna weighting vectors (AWVs) and one or more bitloading vectors (BLVs) by using the at least one first message in accordance with a predetermined rule and transmits a second message comprising information pertinent to the one or more AWVs and the one or more BLVs to the first communications device. The first communications device communicates with the second communications device about an AWV selected from the one or more AWVs and the first and second communications devices apply the selected AWV to the corresponding antennas before exchanging at least one data. The at least one data comprising a header carrying information pertinent to a BLV selected from the one or more BLVs is used to encode the data and a payload is transmitted by the first communication devices to the second communications device. The second communications device decodes the at least one data in accordance with the selected BLV.

An embodiment of a method for exchanging data between a first and a second communications devices is provided, comprising: transmitting at least one first message comprising a plurality of predetermined bit sequences to the second communications device; receiving a second message comprising information pertinent to one or more antenna weighting vectors (AWVs) and one or more bitloading vectors (BLVs) from the second communications device, wherein the second communications device determines the one or more AWVs and one or more BLVs in accordance with a predetermined rule; communicating with the second communications device about an AWV selected from the one or more AWVs, wherein the first and second communications devices apply the selected AWV to the corresponding antennas; and sending a data comprising a header and a payload to the second communications device, wherein the header carries information pertinent to a BLV selected from the one or more BLVs used to encode the data, wherein the second communications device decodes the data in accordance with the selected BLV.

Another embodiment of a method for exchanging data between a first and a second communications devices is provided, comprising: receiving at least one first message comprising a plurality of predetermined bit sequences; determining one or more antenna weighting vectors (AWVs) and one or more bitloading vectors (BLVs) by using the predetermined bit sequences in accordance with a predetermined rule; transmitting a second message comprising information pertinent to the one or more AWVs and one or more BLVs; obtaining information pertinent to an AWV selected from the one or more AWVs from the first communications device, wherein the first and second communications devices apply the selected AWV to corresponding antennas; receiving a data comprising a header and a payload from the first communications device, wherein the header carries information pertinent to a BLV selected from the one or more BLVs used to encode the data; and decoding the data in accordance with the selected BLV.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
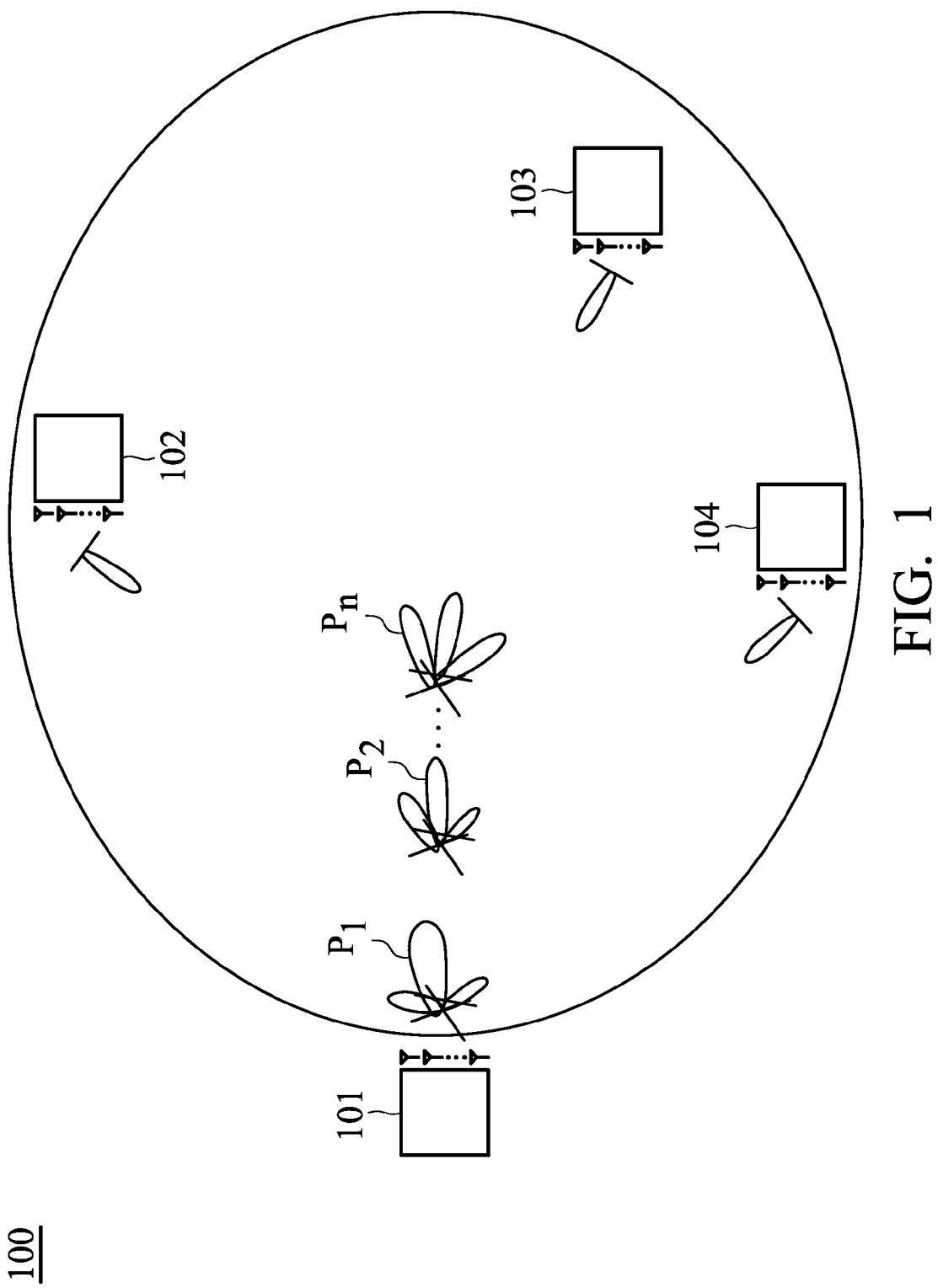
FIG. 1 shows a communications system according to an embodiment of the invention.

FIG. 1 shows a communications system according to an embodiment of the invention. A communications system 100 comprises a plurality of communications devices, for example, the communications devices 101~104. According to an embodiment of the invention, two or more communications devices may detect the presence of each other and start an association process to form an mmWave network.

During the association process, a pair of communications devices exchange information with each other and perform authentication and authorization to form an mmWave network. According to an embodiment of the invention, a beamforming training process may also be adopted in the association process to determine one or more antenna weighting vectors (AWVs) and one or more bitloading vectors (BLVs) between the pair of communications devices. Bitloading is a scheme which minimizes the bandwidth degradation of a broadband channel in the presence of narrow band interference. In a bitloading scheme, the channel condition of each OFDM sub-carrier is measured. According to channel condition, a modulation is selected for each OFDM sub-carrier in order to optimize the performance thereof and minimize transmitted data errors. The BLV is represented in the form of a vector, and each element of the BLV vector represents the modulation assigned to one or more OFDM sub-carriers. In one embodiment, each element of the BLV vector may consist of one or more bits representing a modulation of one or more OFDM sub-carriers. In another embodiment, each element of the BLV vector represents the power loading of the OFDM sub-carrier. The beamforming training process comprises steps wherein the communications devices exchange training signals and packets. In the beamforming training process, a first communications device, such as the communications device 101, may act as a transmitter or a trainer communications device transmitting at least one first message comprising a plurality of predetermined bit sequences, and a second communications device, such as the communications device 102, 103 or 104, may act as a receiver or a trainee communications device for receiving the at least one first message. According to the embodiments of the invention, the first message may be either a training signal or data concatenated with the plurality of predetermined bit sequences.

Figure 2:
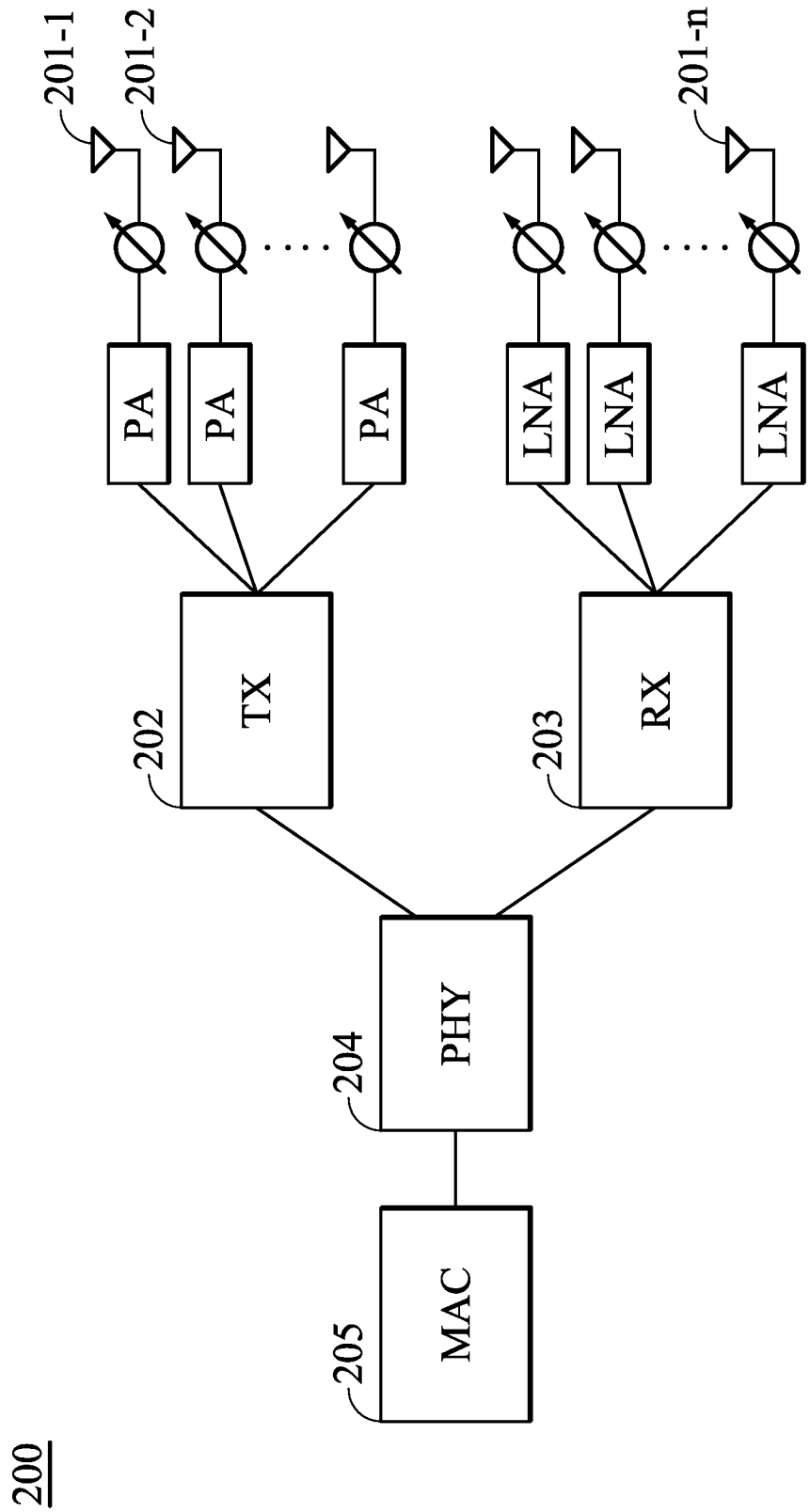
FIG. 2 shows a block diagram of a communications device according to an embodiment of the invention.

FIG. 2 shows a block diagram of a communications device according to an embodiment of the invention. The communications device 200 comprises a plurality of antennas 201-1, 201-2, . . . to 201-n, forming an antenna array for the transmitting radio frequency (RF) module 202 and an antenna array for the receiving RF module 203. The transmitting RF module (TX) 202 processes the signals to be transmitted through the air, and the receiving RF module (RX) 203 processes the signals received from the air for subsequent intermediate frequency (IF) or baseband signal processing. The communications device 200 further comprises a physical layer module 204 and a medium access control layer module 205. The physical layer module 204 and the medium access control layer module 205 may be a firmware or software module to perform a physical layer protocol and a MAC layer protocol in compliance with the mmWave standard. In the beamforming training process, the second (trainee) communications device may determine one or more antenna weighting vectors (AWVs) and one or more bitloading vectors (BLVs) by using the received predetermined bit sequences in accordance with a predetermined rule, and transmit a second message comprising information pertinent to the one or more AWVs and the one or more BLVs to the first (trainer) communications device.

Figure 3:
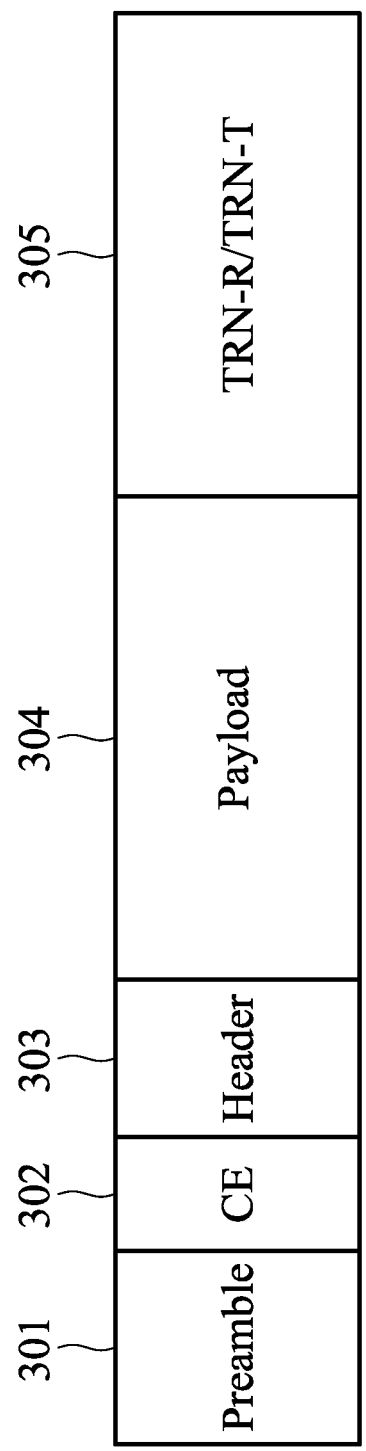
FIG. 3 shows an exemplary transmitted signal according to an embodiment of the invention.

FIG. 3 shows an exemplary transmitted signal (for example, the first message) according to an embodiment of the invention. A transmitted signal, a packet, comprises a preamble 301, a channel estimation (CE) field 302, a header 303, a payload 304 and a training bit sequences 305, wherein the TRN-R represents the training bit sequences for training a receiving direction and the TRN-T represents the training bit sequences for training a transmitting direction. The preamble 301 facilitates the acquisition of the signal by the receiving communications device. The channel estimation field 302 helps the receiving communications device to measure and determine a channel characteristic, such as signal to noise ratio (SNR). The header carries information pertinent to the payload. According to an embodiment of the invention, the receiving communications device (e.g. the second communications device) computes a set of predetermined parameters based on the channel estimation field 302 to determine the characteristics of the channel between the pair of communications devices. As an example, the signal to noise ratio (SNR) of training signals may be the primary factor to determine the one or more AWVs and the estimated sub-carrier channel frequency response may be the primary factor to determine one or more BLVs for the transmitting device.

After obtaining the one or more AWVs and the one or more BLVs, the second communications device sends information pertinent to the obtained one or more AWVs and information pertinent to the obtained one or more BLVs back to the first communications device. The first communications device selects an AWV from the one or more AWVs, and communicate with the second communications device about the selected AWV. After exchanging information pertinent to the selected AWV, the first and second communications devices apply the selected AWV to the corresponding antennas (for example, the antennas 201-1 to 201-n) before exchanging at least one data. Applying the different AWVs may result in different transmitting beam patterns, such as the beam patterns $P_1, P_2 \ldots P_n$ as shown in FIG. 1. According to an embodiment of the invention, based on the selected AWV, a preferable antenna beam pattern may be obtained and a preferable bitloading vector (BLV) may further be determined thereafter by the first communications device.

According to an embodiment of the invention, after selecting a preferable BLV from the one or more BLVs, the first communications device may carry information pertinent to the selected BLV in a header of at least one data, such as the header 303 as shown in FIG. 3, so as to transmit the information to the second communications device. The information pertinent to the selected BLV may be content of the selected BLV. According to another embodiment of the invention, a predetermined index representing a BLV used to encode the subsequent payload of the data may be transmitted by the first communications device as the information. As an example, the first communications device may label each BLV with an index, and carry information pertinent to the index of the newly selected BLV in the header of at least one data. Data transmitted over the mmWave channel are then encoded, distributed and modulated in accordance with the selected BLV to a plurality of sub-carriers and transmitted over the air. The second communications device decodes the at least one data by using the selected BLV.

According to an embodiment of the invention, since information pertinent to the index or the content of the newly selected BLV is carried in the header of at least one data, the first communications device is further capable of flexibly changing the selected BLV to another BLV obtained from the one or more BLVs during the data transmission process, and carry information pertinent to the newly selected BLV in the header of the data. According to an embodiment of the invention, information pertinent to the selected AWV and BLV may be carried in the same packet. As an example, information pertinent to the selected AWV and BLV may be both carried in a management packet or a data packet. The receiver communications device (e.g. the second communications device) may extract information pertinent to the selected AWV and information pertinent to an index of the newly selected BLV or content of the newly selected BLV from the management packet or the data packet. According to another embodiment of the invention, information pertinent to the selected AWV and BLV may be carried in different packets. As an example, information pertinent to the selected AWV may be carried in a management packet, such as a scheduling packet, and information pertinent to the selected BLV may be carried in a data packet. The receiver communications device may extract information pertinent to the selected AWV from the management packet, and extract information pertinent to an index of the newly selected BLV or content of the newly selected BLV from the data packet.

Note that in the embodiments of the invention, either the first or the second communications device is capable of transmitting a revision request to the other side (the second or first communications device) for revising the one or more AWVs and the one or more BLVs during data transmission. Because the one or more AWVs and the one or more BLVs are determined according to characteristics of the channel between the first and the second communications devices, for example, the SNR of a predetermined training bit sequence or the estimated sub-carrier channel frequency response, the first and/or the second communications device may further monitor the channel characteristics and transmit the revision request to the other communications device to request revising the one or more AWVs and the one or more BLVs when the channel characteristics are determined to have been changed. Once the revision request is issued, a new beamforming training process may begin. Either the first or the second communications device receiving the revision request may compute a set of predetermines parameters to determine the characteristics of the channel between the pair of communications devices, determine one or more AWVs and one or more BLVs, and send the one or more AWVs and one or more BLVs back to the transmitting communications device.

Figure 4:
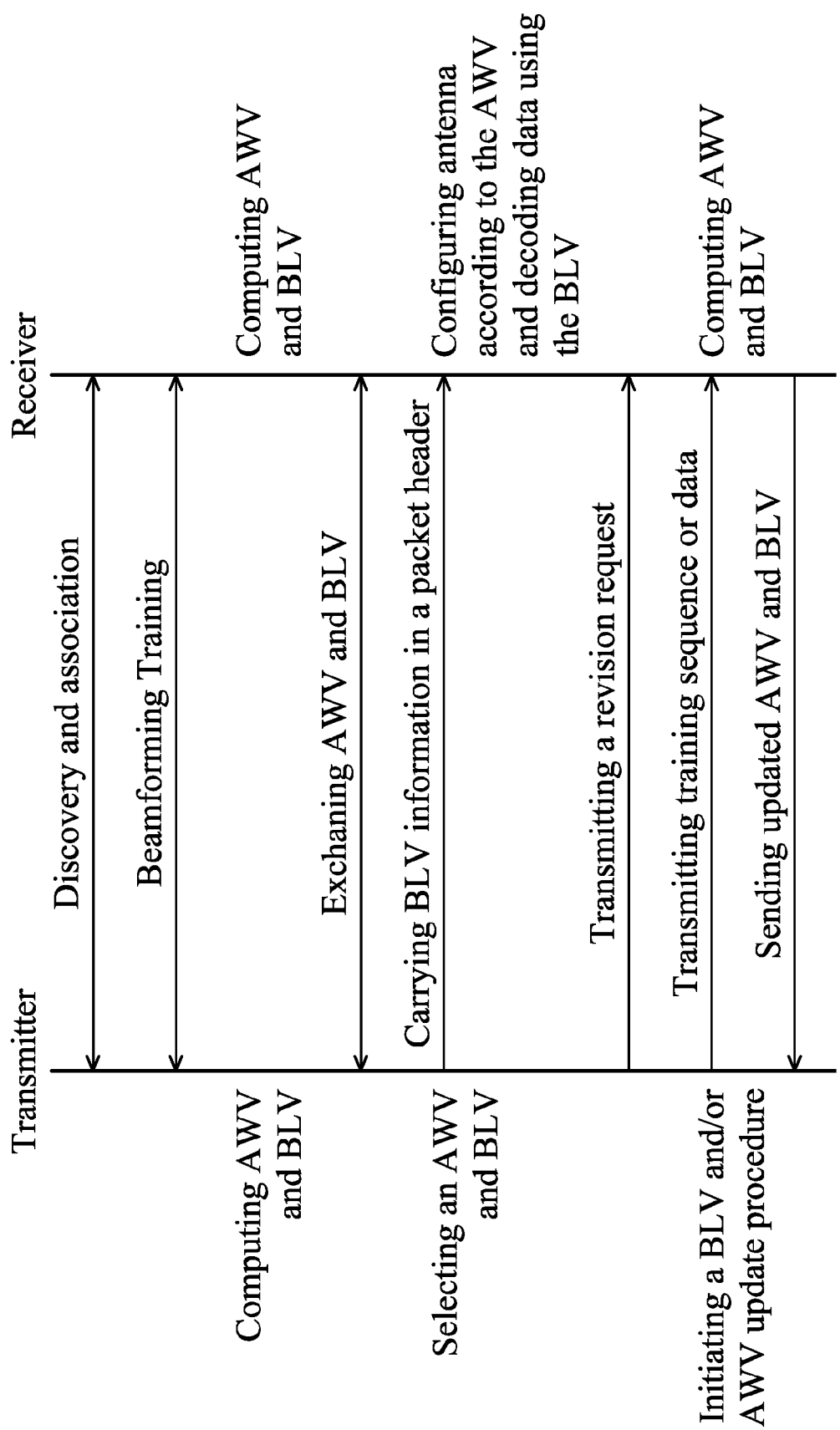
FIG. 4 shows a message flow between a transmitter and a receiver of communications devices according to an embodiment of the invention.

FIG. 4 shows a message flow between a transmitter (e.g. the first communications device) and a receiver (e.g. the second communications device) according to an embodiment of the invention. After the discovery and association processes, a beamforming training process may begin. According to the embodiment of the invention, the beamforming training process may be prescheduled at predetermined time periods and the transmitter may inform the receiver of the beginning of a beamforming training process. After informing the receiver, the transmitter transmits at least one first message comprising a plurality of predetermined bit sequences to the receiver. The receiver computes one or more antenna weighting vectors (AWVs) and one or more bitloading vectors (BLVs) by using the predetermined bit sequences in accordance with a predetermined rule. Next, the receiver transmits a second message comprising information pertinent to the one or more AWVs and one or more BLVs to the transmitter. The transmitter may also compute one or more AWVs and one or more BLVs and exchange the one or more AWVs and one or more BLVs with the receivers. Next, the transmitter selects an AWV and a BLV from the one or more AWVs and one or more BLVs. The transmitter first selects the AWV before exchanging the at least one data and communicates with the receiver about the selected AWV. Both the transmitter and the receiver apply the selected AWV to the corresponding antennas. After the AWV is selected, the transmitter selects the BLV from the one or more BLVs. The transmitter carries information pertinent to the selected BLV in a packet header, encode the payload of the packet by using the selected BLV as previously described, and transmit the packet to the receiver. Therefore, the receiver decodes the data in accordance with the selected BLV. Note that according to the embodiments of the invention, either the transmitter or the receiver is capable of transmitting a revision request to the other communications device to request to revise the one or more AWVs and the one or more BLVs during data transmission. As an example shown in FIG. 4, the transmitter transmits a revision request to the receiver to initiate a BLV and/or AWV update procedure. Next, the transmitter transmits a training sequence or data to the receiver to re-compute the AWVs and BLVs. Finally, the receiver sends the updated AWV and BLV to the transmitter. After applying the updated AWV to the corresponding antennas, the transmitter carries information pertinent to the updated BLV in a packet header, encodes the payload of the packet by using the updated BLV as previously described, and begin to transmit data to the receiver by using the updated BLV.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for exchanging data between a first and a second communications devices comprising:
    transmitting at least one first message comprising a plurality of predetermined bit sequences to the second communications device by the first communications device;
    receiving a second message comprising a plurality of antenna weighting vectors (AWVs) and a plurality of bitloading vectors (BLVs) from the second communications device, wherein the second communications device determines the plurality of AWVs and plurality of BLVs in accordance with a predetermined rule and wherein each element in one bitloading vector comprises one or more bits representing a modulation of one or more OFDM sub-carriers;
    communicating with the second communications device about an AWV selected by the first communications device from the plurality of AWVs, wherein the first and second communications devices apply the selected AWV to the corresponding antennas; and sending a first packet comprising a header and a payload to the second communications device, wherein the header carries information pertinent to a BLV selected from the plurality of BLVs and used to encode the first packet, wherein the second communications device decodes the first packet by using the selected BLV.

2. The method as claimed in claim 1, further comprising: selecting another BLV from the plurality of BLVs; and transmitting information pertinent to the newly selected BLV in a header of a second packet.

3. The method as claimed in claim 1, wherein the plurality of AWVs and the plurality of BLVs are determined according to characteristics of the channel between the first and the second communications devices, and the method further comprises:
monitoring the channel characteristics; and
transmitting a revision request to the second communications device to request to revise the plurality of AWVs and the plurality of BLVs when the channel characteristics are determined to have been changed.

4. The method as claimed in claim 1, further comprising: labeling each BLV by an index; and
carrying information pertinent to the index of the selected BLV or content of the selected BLV in the header of the first packet.

5. The method as claimed in claim 1, further comprising: transmitting a management packet comprising information pertinent to the selected AWV.

6. The method as claimed in claim 1, further comprising: transmitting a data packet encoded by using the selected BLV.

7. The method as claimed in claim 1, further comprising: transmitting a revision request to request for revising the plurality of AWVs and the plurality of BLVs.

8. A method for exchanging data between a first and a second communications devices comprising:
receiving at least one first message comprising a plurality of predetermined bit sequences from the first communications device;
determining a plurality of antenna weighting vectors (AWVs) and a plurality of bitloading vectors (BLVs) by using the plurality of predetermined bit sequences in accordance with a predetermined rule;
transmitting a second message comprising the plurality of AWVs and plurality of BLVs;
obtaining information pertinent to an AWV selected by the first communications device from the plurality of AWVs from the first communications device,
wherein the first and second communications devices apply the selected AWV to corresponding antennas;
receiving a packet comprising a header and a payload from the first communications device,
wherein the header carries information pertinent to a BLV selected from the plurality of BLVs and used to encode the packet; and
decoding the packet by using the selected BLV.

9. The method as claimed in claim 8, wherein the plurality of AWVs and the plurality of BLVs are determined according to characteristics of the channel between the first and the second communications devices, and the method further comprises:
monitoring the channel characteristics; and
transmitting a revision request to the first communications device to request to revise the plurality of AWVs and the plurality of BLVs when the channel characteristics are determined to have been changed.

10. The method as claimed in claim 8, further comprising: extracting information pertinent to an index of the selected BLV or content of the selected BLV from the header of the packet, wherein each BLV is labeled by a corresponding index by the first communications device and the header carries the information pertinent to the index of the selected BLV.

11. The method as claimed in claim 8, wherein the plurality of AWVs is determined according to a signal to noise ratio of the received plurality of predetermined bit sequences and the plurality of BLVs is determined according to an estimated channel impulse response of the channel between the first and the second communications devices.

12. The method as claimed in claim 8, further comprising: extracting the selected BLV from the header of the packet.

13. The method as claimed in claim 8, further comprising: transmitting a revision request to request for revising the plurality of AWVs and the plurality of BLVs.

14. A communications system, comprising:
a first communications device transmitting at least one first message comprising a plurality of predetermined bit sequences; and
a second communications device determining plurality of antenna weighting vectors (AWVs) and plurality of bitloading vectors (BLVs) by using the at least one first message in accordance with a predetermined rule and transmitting a second message comprising the plurality of AWVs and the plurality of BLVs to the first communications device,
wherein the first communications device communicates with the second communications device about an AWV selected by the first communications device from the plurality of AWVs and the first and second communications devices apply the selected AWV to the corresponding antennas before exchanging at least one first packet,
wherein the at least one first packet comprising a header carrying information pertinent to a BLV selected from the plurality of BLVs and used to encode the at least one first packet and a payload is transmitted by the first communications device to the second communications device, and
wherein the second communications device decodes the at least first packet in accordance with the selected BLV.

15. The communications system as claimed in claim 14, wherein the first communications device further changes the selected BLV to another BLV obtained from the plurality of BLVs in accordance with a channel condition during the packet transmission process, and places the newly selected BLV in the header of a second packet.

16. The communication system as claimed in claim 15, wherein the first communications device places information pertinent to the index of the newly selected BLV or content of the newly selected BLV in the header of the second packet, and wherein the second packet is a data packet or a management packet.

17. The communication system as claimed in claim 14, wherein the first communications device transmits information pertinent to the selected AWV in a management packet and the at least one first packet is a data packet.

18. The communication system as claimed in claim 14, wherein the first communications device transmits information pertinent to the selected AWV in a management packet or a data packet.

19. The communication apparatus as claimed in claim 14, wherein either the first or the second communications device is capable of transmitting a revision request to the other of the first or the second communications device to request to revise the plurality of AWVs and the plurality of BLVs.

20. The communication apparatus as claimed in claim 14, wherein the plurality of AWVs is calculated according to a signal to noise ratio of the received plurality of predetermined bit sequences and the plurality of BLVs is calculated according to an estimated channel impulse response of the channel between the first and the second communications devices.

* * * * *